United States Patent [19]
Phillips et al.

[11] Patent Number: 5,711,253
[45] Date of Patent: Jan. 27, 1998

[54] SMALL ANIMAL CONNECTIBLE PLAY CUBE SYSTEM

[75] Inventors: Gerald Phillips, Wantagh; Steven Wilkonski, East Meadows; Marvin Goldman, North Hills, all of N.Y.

[73] Assignee: Penn-Plax, Inc., Garden City, N.Y.

[21] Appl. No.: 665,803

[22] Filed: Jun. 18, 1996

[51] Int. Cl.$^6$ .................................................. A01K 1/00
[52] U.S. Cl. ..................... 119/706; 119/452; 119/421; 482/35
[58] Field of Search .................................. 119/706, 707, 119/417, 421, 452; 482/35, 36

[56] References Cited

U.S. PATENT DOCUMENTS

| | | | |
|---|---|---|---|
| D. 238,694 | 2/1976 | Jamison | 482/35 X |
| 3,485,494 | 12/1969 | Lieberman | 482/35 |
| 3,742,908 | 7/1973 | Merino | 119/455 |
| 3,994,262 | 11/1976 | Suchowski et al. | 119/452 |
| 4,301,766 | 11/1981 | Piccone | 119/706 X |
| 5,092,269 | 3/1992 | Phillips et al. | 119/452 |
| 5,186,122 | 2/1993 | Phillips et al. | 119/474 |
| 5,226,864 | 7/1993 | Showers | 482/35 |
| 5,387,165 | 2/1995 | Warren | 482/35 |
| 5,465,682 | 11/1995 | Chavollo, Jr. | 119/707 X |
| 5,496,232 | 3/1996 | Morris et al. | 482/35 |
| 5,577,464 | 11/1996 | Wellington et al. | 119/452 X |

FOREIGN PATENT DOCUMENTS

94012241 A1 6/1994 WIPO ................................. 482/35

*Primary Examiner*—Gene Mancene
*Assistant Examiner*—Yvonne R. Abbott
*Attorney, Agent, or Firm*—Nikaido, Marmelstein, Murray & Oram LLP

[57] ABSTRACT

A small animal connectible play cube system which includes several connectible small animal play cubes, each cube having at least one surface formed with a large plurality of small through openings and at least one other surface with a single large opening, and an attaching adaptor for each pair of cubes, the adaptor having structure on opposite sides for attaching the adaptor to the large opening of the at least one other surface. The cubes are connectible together in various configurations depending upon which surfaces are attached by the adaptors. The invention can further include a slide member which is connectible to the small through openings on the one surface of the cube. The slide member can be a first type slide member having a straight longitudinal axis. Also, the slide member can be a second type slide member having a curved longitudinal axis. The second type slide member describes a spiral extending through 270°. The attaching adaptor can be a ring member having a main annular body with the necessary structure to connect to either the large opening of the cubes or to other small animal accessories. As an example, two of the cubes may be attached to each other with a tunnel tube therebetween.

9 Claims, 3 Drawing Sheets

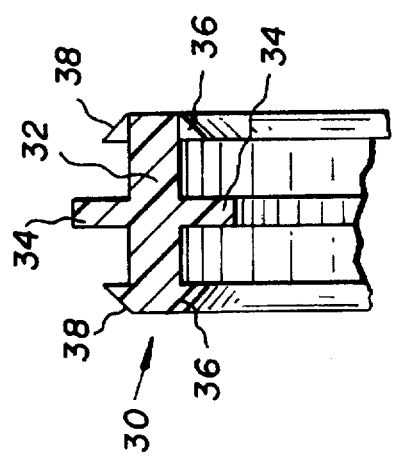
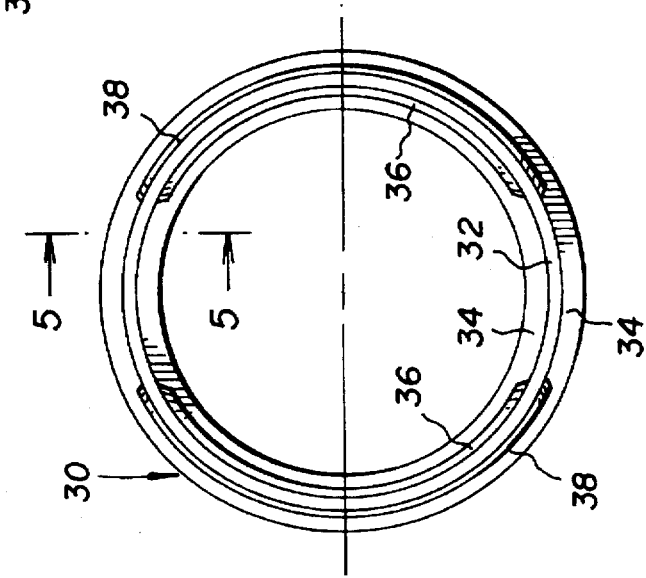
FIG. 3  FIG. 4  FIG. 5

5,711,253

SMALL ANIMAL CONNECTIBLE PLAY CUBE SYSTEM

BACKGROUND OF THE INVENTION

The present invention relates to a system for use by home hobbyists to exercise and have fun with small animals such as hamsters, gerbils and mice. Small animal play toys are known and have been used in both the home and laboratory setting for many years. More particularly, the present invention provides a small animal connectible play cube system with advantageous features which make it easier to maintain and more fun for the home hobbyist to keep and play with these animals.

It is commonly known for home hobbyists to provide various small containers such as cardboard boxes and the like for their small animals to explore and climb on and about. Generally, these have been made of wood, plastic, or cardboard and are placed into the small animal's habitat enclosure.

Additionally, apparatuses are known for connecting an assortment of enclosure modules and accessories, such as exercise wheels and feeders, to a main small animal enclosure unit. Such habitat enclosures and accessories are shown for example in U.S. Pat. No. 5,092,269 to Phillips et al and No. 5,186,122 to Phillips et al, both of which are expressly incorporated herein by reference.

However, it is difficult to connect plain boxes on an ad hoc basis. Further, it is difficult to clean such play toys and therefore, they are commonly discarded after a single use.

It is also known that since animals such as hamsters and gerbils are naturally curious animals, it is beneficial to provide their habitats with something to play upon.

SUMMARY OF THE INVENTION

It is an object of the present invention to provide a small animal connectible play cube system that is easy to assemble in different arrangements, easy to clean, and safe for the small animals.

The present invention is embodied in a small animal connectible play cube system which comprises at least two connectible small animal play cubes, each cube having at least one surface with a single large opening; at least one attaching adaptor, the adaptor having means on opposite sides for attaching the adaptor to the large opening of the at least one surface; wherein the at least two cubes are connectible together in various configurations of the at least one surface of one cube relative to the at least one surface of another cube. In this manner, the cubes can be connected together in various arrangements. At least one other surface may be formed with a large plurality of small through openings.

The invention can further comprise a slide member having means for connecting to at least one of the small through openings of the one other surface of the cube. The slide member can be a first type slide member having a straight longitudinal axis. Also, the slide member can be a second type slide member having a curved longitudinal axis. The second type slide member describes a spiral extending through 270°. In each slide member, the means for connecting comprises a pair of protrusions extending longitudinally from at least one end of the member sized and positioned to tightly fit into two of the small through openings of the cube.

In accordance with the present invention, the attaching adaptor comprises a ring member having a main annular body, a central flange extending radially inwardly and radially outwardly of the annular body, a pair of radially inwardly directed first engaging elements extending around at least part of the circumferential edge of each end of the main annular body, and a pair of radially outwardly directed second engaging elements extending around at least part of the circumferential edge of each end of the main annular body. Additionally, the radial inward portions of the ring member are sized to be connectible with the tubes and enclosure members and the like as disclosed in the above referenced patents. In this manner, two or more cubes may be connectible with a tunnel tube separating the cubes.

The present invention has one or more connectible small animal play cubes fabricated from a plastic material, preferably non-transparent. Since the cubes are made of a plastic material, they are easy to clean and maintain.

BRIEF DESCRIPTION OF THE DRAWINGS

The above and other objects and advantages of the present invention will become readily apparent by reference to the following detailed description when considered in conjunction with the accompanying drawings wherein:

FIG. 3 and FIG. 4 are end views of the opposite sides of the attaching adaptor.

FIG. 5 is a partial cross-section view of the attaching adaptor taken along lines 5—5 of either FIG. 3 or FIG. 4.

Like reference numerals refer to like parts throughout the several views of the drawings.

DETAILED DESCRIPTION OF THE INVENTION

Figure 1:
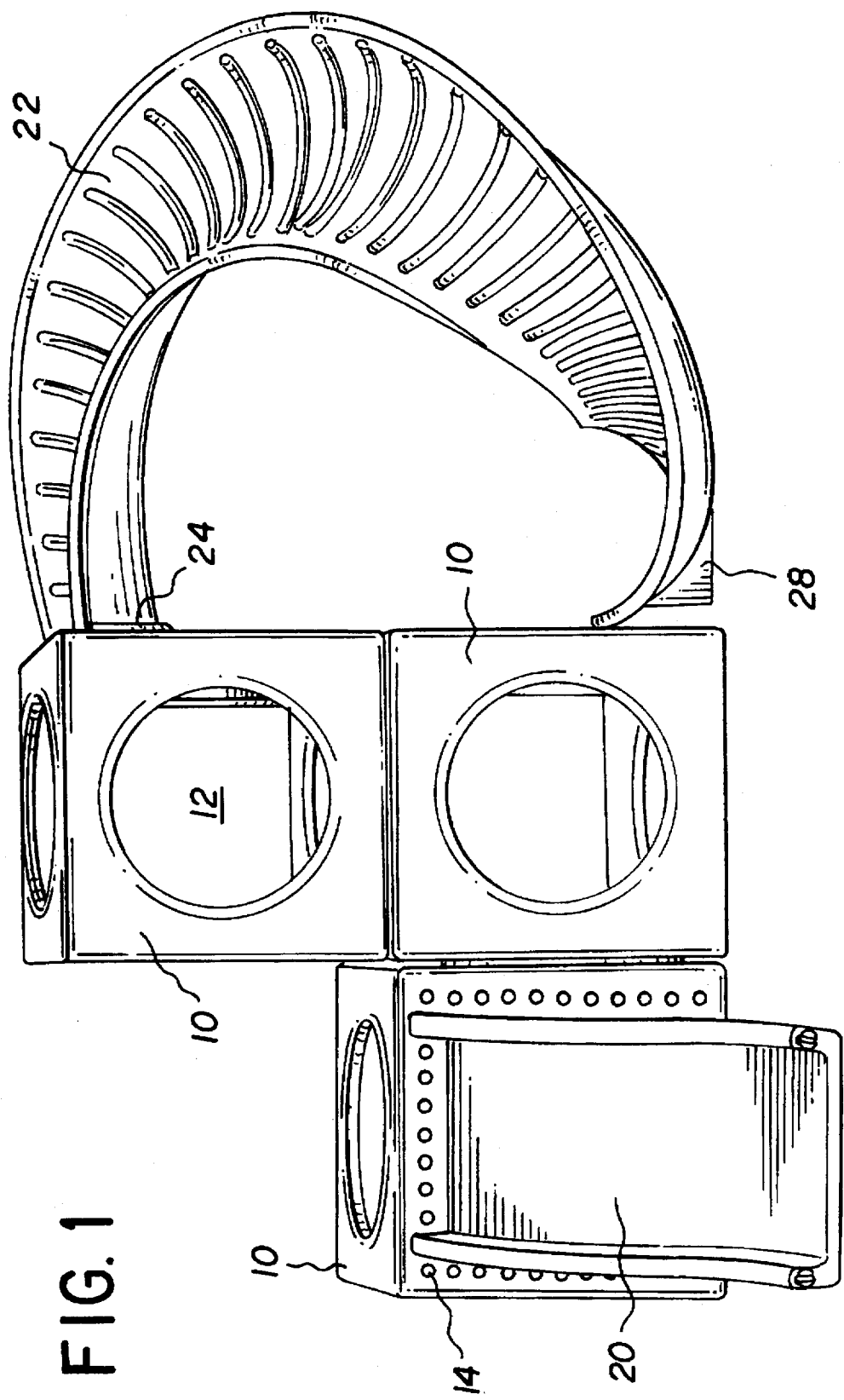
FIG. 1 is a perspective view of a simple small animal connectible play cube system presenting one embodiment of the present invention.

FIG. 1 shows a simple small animal connectible play cube system set up in the manner of a child's playground set. That is, cubes 10 are stacked and connected together with first slide member 20 extending along a straight longitudinal axis and a second slide member 22 having a curved longitudinal axis describing a spiral extending through 270°. The cubes 10 are connected to each other through attaching adaptors 30 shown in detail in FIGS. 4, 5, and 6.

Each cube 10 has at least one surface formed with a single large opening 12 and may have at least one other surface formed with a large plurality of small through openings 14. The preferred embodiment is a square cube with one face having the small through openings 14 arranged in a square grid and the remaining five faces each having a single large opening 12. The large openings 12 are preferably round, but can also be arch-shaped with the curved portion of the arch being of the same radius as the other large openings and the base of the arch being of the same width. The large through openings must be of sufficient size for an animal such as a hamster to crawl through, approximately 1 to 4 inches in diameter.

Figure 2:
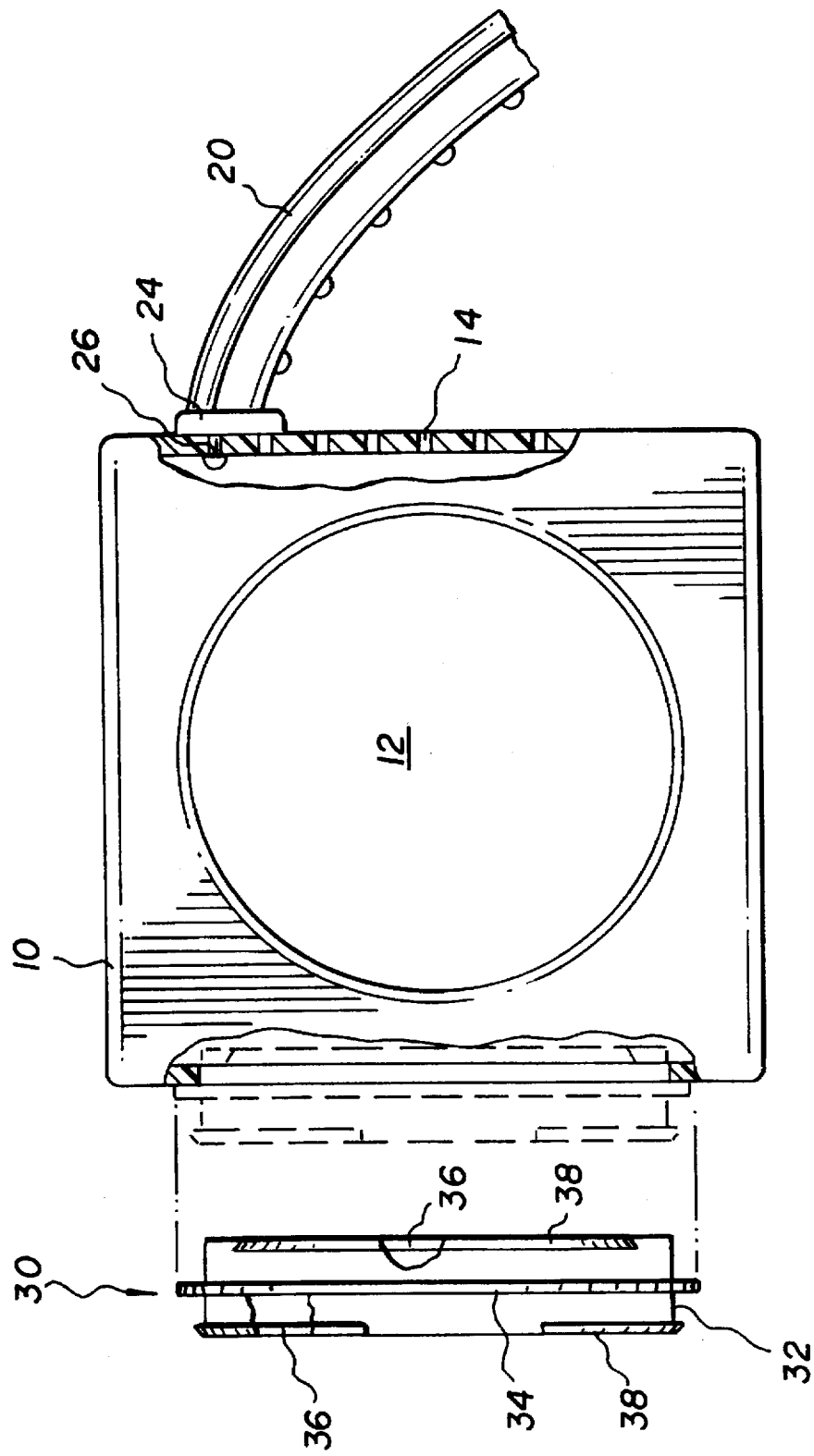
FIG. 2 is a side view in partial cross-section showing the connection of the slide member and the attaching adaptor to a cube of the present invention.

Each of the slide members 20 or 22 have provided at least one end thereof means for connecting to at least one of the small through openings 14 of the one surface of the cube. The means for connecting can comprise a pair of protrusions 26 extending longitudinally from one end of the slide member 20, 22, sized and positioned to tightly fit into two of the small through openings 14 as shown in FIG. 2. Additionally, the end can have a facing flange 24 to improve the connection. The lower end of the second slide member 22 can have a standing support flange 28 molded thereon to aid in positioning of the member.

The attaching adaptor 30 is shown in FIGS. 2–5. The adaptor has means on opposite sides for attaching the adaptor to one of the large openings 12 of the cube 10. Preferably, the attaching adaptor 30 comprises a ring member having a main annular body 32, a central flange 34 extending radially inwardly and radially outwardly of the annular body 32, a pair of radially inwardly directed first engaging elements 36 extending around at least part of the circumferential edge of each end of the main annular body 32, and a pair of radially outwardly directed second engaging elements 38 extending around at least part of the circumferential edge of each end of the main annular body 32. The ends of the pair of second engaging elements 38 on each end of the main annular body 32 are circumferentially separated from each other in the nature of a bayonet mounting as is plainly evident in FIGS. 3 and 4. The outer diameter of the main annular body is the same as the diameter of the large through opening 12. This permits the relatively easy insertion of the adaptor 30 into the large opening 12 of the cube 10. The ends of the pair of first engaging elements 36 on each end of the main annular body 32 are also circumferentially separated from each other in the nature of a bayonet mounting as is plainly evident in FIGS. 3 and 4. This enables adaptor to connect the cube 10 with tunnel tubes and other accessories such as exercise wheels and feeders, as shown in U.S. Pat. No. 5,092,269 to Phillips et al and No. 5,186,122 to Phillips et al, both of which are expressly incorporated herein by reference.

The preferred material of construction of the cubes 10, the slide members 20, 22, and the adaptors 30 is polypropylene or other thermoplastic materials.

The above described is intended to be representative only, as certain modifications within the scope of these teachings will be apparent to those skilled in the art of small animal care.

Accordingly, reference should be made to the following claims in determining the full scope of the invention.

What is claimed is:

1. A small animal connectible play cube system comprising:
   at least two connectible small animal play cubes, each cube having at least one surface with a single large opening;
   at least one attaching adaptor, said adaptor having means on opposite sides for attaching said adaptor to said large opening of said one surface;
   wherein said at least two cubes are connectible together in various configurations of said one surface of one cube relative to said one surface of another cube; and
   wherein said attaching adaptor comprises a ring member having a main annular body, a central flange extending radially inwardly and radially outwardly of said annular body, a pair of radially inwardly directed first engaging elements extending around at least part of the circumferential edge of each end of said main annular body, and a pair of radially outwardly directed second engaging elements extending around at least part of the circumferential edge of each end of said main annular body.

2. A small animal connectible play cube system according to claim 1, wherein at least one other surface is formed with a large plurality of small through openings.

3. A small animal connectible play cube system according to claim 2, further comprising a slide member having means for connecting to at least one of said small through openings of said one other surface of said cube.

4. A small animal connectible play cube system according to claim 3, wherein said slide member is a first slide member having a straight longitudinal axis.

5. The small animal connectible play cube system according to claim 3, wherein said slide member is a second slide member having a curved longitudinal axis.

6. The small animal connectible play cube system according to claim 5, wherein said second slide member describes a spiral extending through 270°.

7. A small animal connectible play cube system according to claim 3, wherein said means for connecting comprises a pair of protrusions extending longitudinally from at least one end of said member sized and positioned to tightly elastically fit into two of said small through openings.

8. A small animal connectible play cube system according to claim 1, further comprising a tunnel tube attachable to said attaching adaptor on one side thereof.

9. A small animal connectible play cube system comprising:
   at least two connectible small animal play cubes, each cube having at least one surface formed with a large plurality of small through openings and at least one other surface with a single large opening;
   at least one attaching adaptor, said adaptor having means on opposite sides for attaching said adaptor to said large opening of said at least one other surface;
   said at least two cubes being connectible together in various configurations of said at least one surface of one cube relative to said at least one surface of another cube; and
   a slide member having means for connecting to at least one of said small through openings of said one surface of said cube;
   wherein said attaching adaptor comprises a ring member having a main annular body, a central flange extending radially inwardly and radially outwardly of said annular body, a pair of radially inwardly directed first engaging elements extending around at least part of the circumferential edge of each end of said main annular body, and a pair of radially outwardly directed second engaging elements extending around at least part of the circumferential edge of each end of said main annular body.

* * * * *